(12) United States Patent
Kottmyer

(10) Patent No.: US 6,453,670 B1
(45) Date of Patent: Sep. 24, 2002

(54) TWO-PIECE STATIONARY SEAL MASTER CYLINDER

(75) Inventor: Daniel L. Kottmyer, Fairborn, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/745,616

(22) Filed: Dec. 21, 2000

(51) Int. Cl.⁷ .............................. B60T 13/20; F16J 10/00
(52) U.S. Cl. .......................... 60/552; 60/585; 92/171.1
(58) Field of Search ......................... 60/585, 562, 552; 92/171.1, 169.1

(56) References Cited

U.S. PATENT DOCUMENTS

| 4,249,381 A | 2/1981 | Gaiser ......................... 60/562 |
| RE31,080 E | * 11/1982 | Gaiser ......................... 60/562 |
| 4,414,811 A | 11/1983 | Gaiser ......................... 60/589 |
| 4,671,169 A | * 6/1987 | Hillier ........................... 92/59 |
| 4,945,729 A | 8/1990 | Hayashida et al. ........... 60/562 |
| 5,036,664 A | 8/1991 | Camm ......................... 60/534 |
| 5,496,102 A | 3/1996 | Dimatteo et al. ........... 303/162 |

FOREIGN PATENT DOCUMENTS

| DE | 19520679 A1 | 6/1996 | ........... B60T/11/20 |
| DE | 19520684 A1 | 7/1996 | ........... B60T/11/50 |
| EP | 0057638 | 3/1985 | ........... B60T/11/20 |
| EP | 0327357 | 8/1989 | ........... B60T/11/20 |
| JP | 11091542 A | 4/1999 | ........... B60T/11/20 |
| WO | WO9108936 | 6/1991 | ........... B60T/11/20 |
| WO | WO9410017 | 5/1994 | ........... B60T/11/20 |
| WO | WO9623684 | 8/1996 | ........... B60T/11/16 |

* cited by examiner

Primary Examiner—Edward K. Look
Assistant Examiner—Michael Leslie
(74) Attorney, Agent, or Firm—Scott A. McBain

(57) ABSTRACT

A master cylinder for vehicle braking systems includes a housing having a central cavity, at least one fluid supply inlet port, at least one pressure outlet port, and a flange at one end thereof. A piston actuation mechanism within the central cavity is moveable between a first position wherein the central cavity is in fluid communication with the fluid supply inlet and a second position where the central cavity is in fluid communication with the pressure outlet. A cup-shaped end cap is fastened to the housing flange in a fluid sealing relationship wherein the cup-shaped end cap receives at least a portion of the piston actuating mechanism therein and further retains the piston actuation mechanism in an operational configuration within the housing.

13 Claims, 4 Drawing Sheets

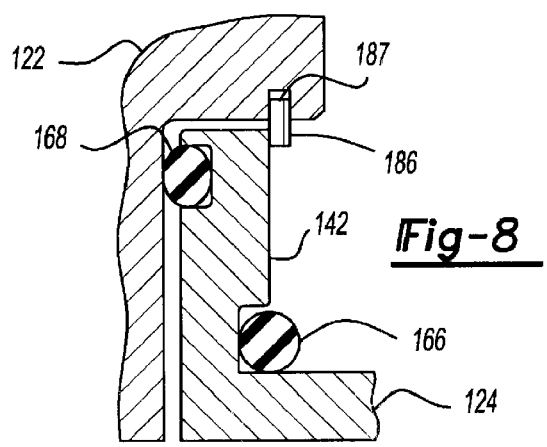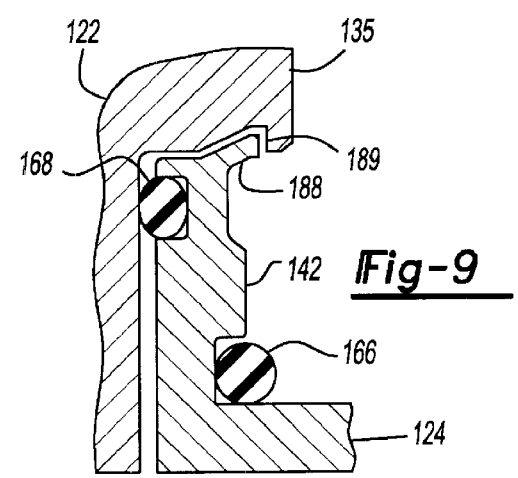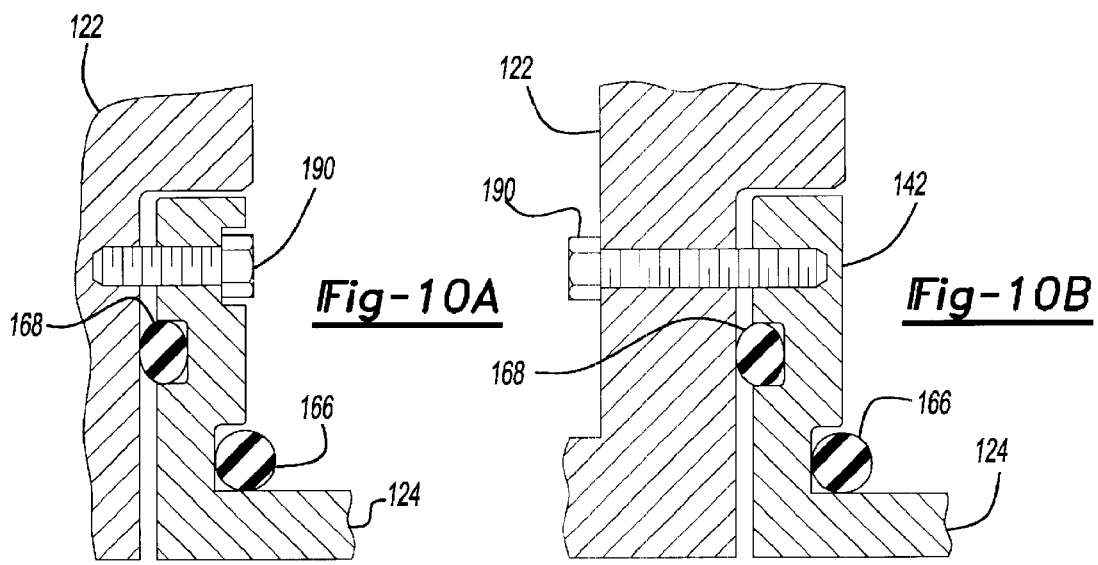

TWO-PIECE STATIONARY SEAL MASTER CYLINDER

TECHNICAL FIELD

This invention relates generally to master cylinders for vehicle braking systems and more specifically to an end cap for retaining the piston actuating mechanism within the master cylinder.

BACKGROUND OF THE INVENTION

Vehicle braking systems have long employed various configurations of a master cylinder. The master cylinder transforms the mechanical travel of a brake pedal in a vehicle to fluid pressure which is then transmitted via brake lines to brake drums or disc brakes at the wheels of a vehicle. Generally, a brake pedal when depressed by an operator causes a translation of a mechanical linkage. The mechanical linkage extends from the passenger compartment of the vehicle to most commonly the engine compartment. The mechanical linkage engages one end of the brake system master cylinder. The master cylinder is generally comprised of a reservoir mounted atop a master cylinder housing. The master cylinder housing has one or two inlets for supplying brake fluid at atmospheric pressure to the master cylinder piston actuating mechanism. As the brake pedal is depressed, the linear translation of the linkage causes the piston actuating mechanism to translate within the master cylinder housing. The translation of the piston actuating mechanism results in an increase in the fluid pressure which is in turn transmitted to the individual brakes at the wheels for braking the vehicle.

While the concept of mechanically translating a piston to transform linear motion into increased fluid pressure has been understood for many years and is the basic principal in the operation of braking system master cylinders throughout the vehicle industry, the specific construction of individual master cylinders are relatively complex and involve a large number of components. These large numbers of components comprising a master cylinder assembly further requires that the individual parts be manufactured to fine tolerances to minimize the degree of travel of the brake pedal before braking becomes effective. Typically, master cylinders include both a primary and a secondary piston, which are arranged in an in-line configuration. Such a configuration generally results in a final assembly that is relatively long. Newer vehicles include a power braking system wherein the master cylinder is coupled to a vacuum booster to minimize the amount of pressure a vehicle operator must place on the brake pedal to accomplish effective braking of the vehicle. The vacuum booster further adds to the length of the assembly.

As motor vehicles have evolved over the years and especially recently, engine compartments are becoming smaller while at the same time there are an ever increasing number of engine accessories and components which must be located within the engine compartment. Consequently, minimization of the overall size of the combination vacuum booster and master cylinder assembly has become highly desirable. Various means for reducing the assembly size have been incorporated including having at least a portion of the master cylinder assembly extending into the vacuum booster.

While such designs have helped to alleviate the space problem within the engine compartment, they have also contributed to the increased complexity in the design of the master cylinder. Specifically, the portion of the master cylinder that extends into the vacuum booster, is commonly called the boot nose portion of the master cylinder. The boot nose portion of the master cylinder also includes the opening to the internal cavity of the master cylinder whereby the piston actuating mechanism is inserted. Once the piston actuating mechanism is inserted into the master cylinder it must be retained therein in such a manner that it will withstand the linear pressures exerted by the pressurized brake fluid when the braking system is actuated. Until now, the most common method for retaining the piston actuating mechanism within the master cylinder is with a bearing socket. As shown in FIG. 2, illustrating one embodiment of the prior art, the boot nose portion 24 of a master cylinder housing 22 defines an internal cavity 23. The piston actuating mechanism 21 is inserted into cavity 23 and is retained therein with a bearing socket 29. Bearing socket 29 incorporates a large diameter fine-machined thread about its outer periphery, which is threaded into matching internal threads in the boot nose portion 24 of the master cylinder housing 22.

Such a configuration wherein a bearing socket incorporates large diameter fine threads to be threaded into matching threads in the boot nose of the master cylinder results in substantial complexity and cost in the manufacture of the master cylinder components. In addition to the increased cost of manufacturing the large diameter threads, there is a corresponding difficulty in assembling two components with large diameter fine threads. Large diameter fine threads increase the probability that when the two parts are mated, the parts can be axially misaligned thus resulting in cross threading of the bearing socket into the boot nose. Such cross-threading results in undesired scrapping of precision machined components, thus adding unnecessary expense to the manufacturing process. Thus, there is a need in the industry for a mechanism by which the precision-machined parts can be properly mated and aligned while minimizing the manufacturing cost and providing for ease of assembly.

SUMMARY OF THE INVENTION

One aspect of the present invention is a master cylinder for vehicle braking systems. The master cylinder includes a housing having a central cavity with at least one fluid supply inlet port and at least one pressure outlet port. The housing also has a flange at one end thereof. A piston actuation mechanism is housed within the central cavity and is moveable between a first position wherein the central cavity is in fluid communication with the fluid supply inlet and a second position wherein the central cavity is in fluid communication with the pressure outlet. A cup-shaped end cap is fastened to the housing flange in a fluid sealing relationship. The cup-shaped end cap receives at least a portion of the piston actuation mechanism and retains the piston actuation mechanism in an operational configuration within the housing.

Another aspect of the present invention is a cup-shaped end cap for retaining a piston actuation mechanism within a master cylinder housing. The end cap comprises a tubular body having a wall defining a central cavity for receiving a portion of the piston actuating mechanism therein and a bottom at one end of the body. A flange extends peripherally outward from the body at an opposite end wherein the flange defines a central opening for receiving the piston actuation mechanism of a master cylinder. The flange further comprises a resilient seal on at least one face thereof.

These and other features, advantages, and objectives of the present invention will be further understood and appreciated by those skilled in the art by reference to the following specification, claims and appended drawings.

BRIEF DESCRIPTION OF THE DRAWINGS

FIG. 8 illustrates the retention of the end cap to the master cylinder housing utilizing a snap-ring.

FIG. 9 illustrates retention of the end cap to the master cylinder housing by deforming a portion of the periphery of the end cap.

FIGS. 10A–10B illustrate the fastening of the end cap to the master cylinder housing utilizing a threaded bolt.

DESCRIPTION OF THE PREFERRED EMBODIMENT

Figure 1:
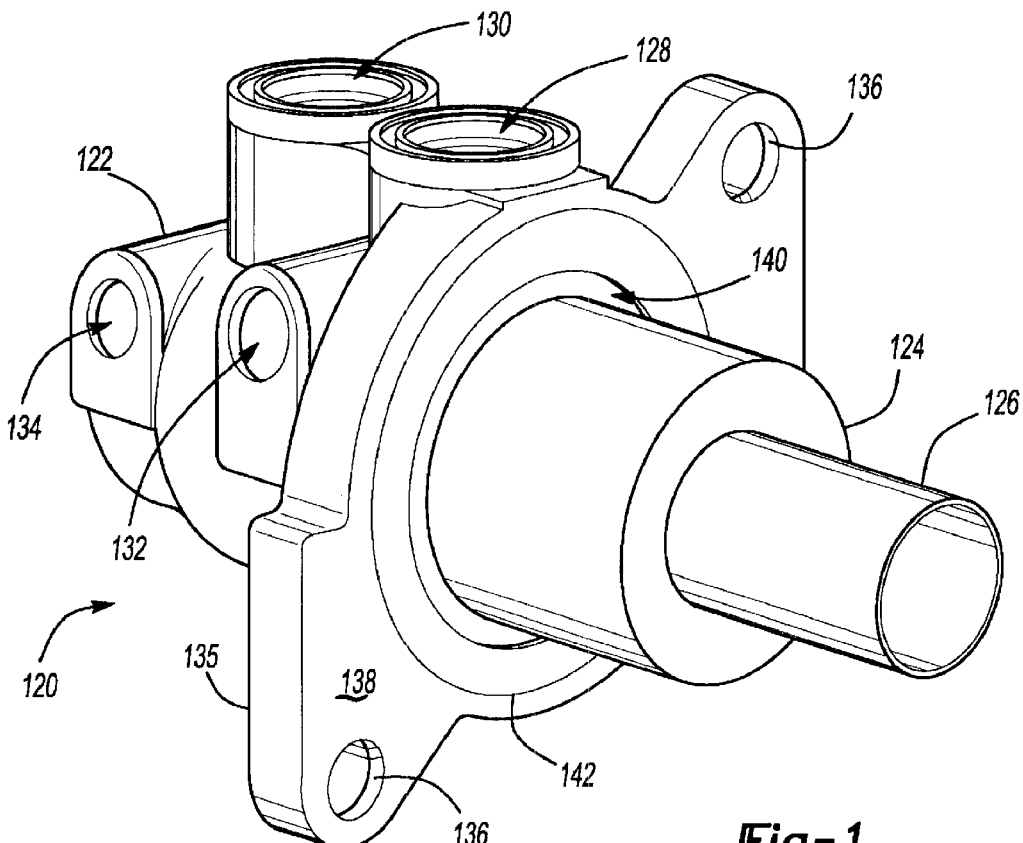
FIG. 1 shows a perspective view of a master cylinder incorporating the present invention.
Figure 3:
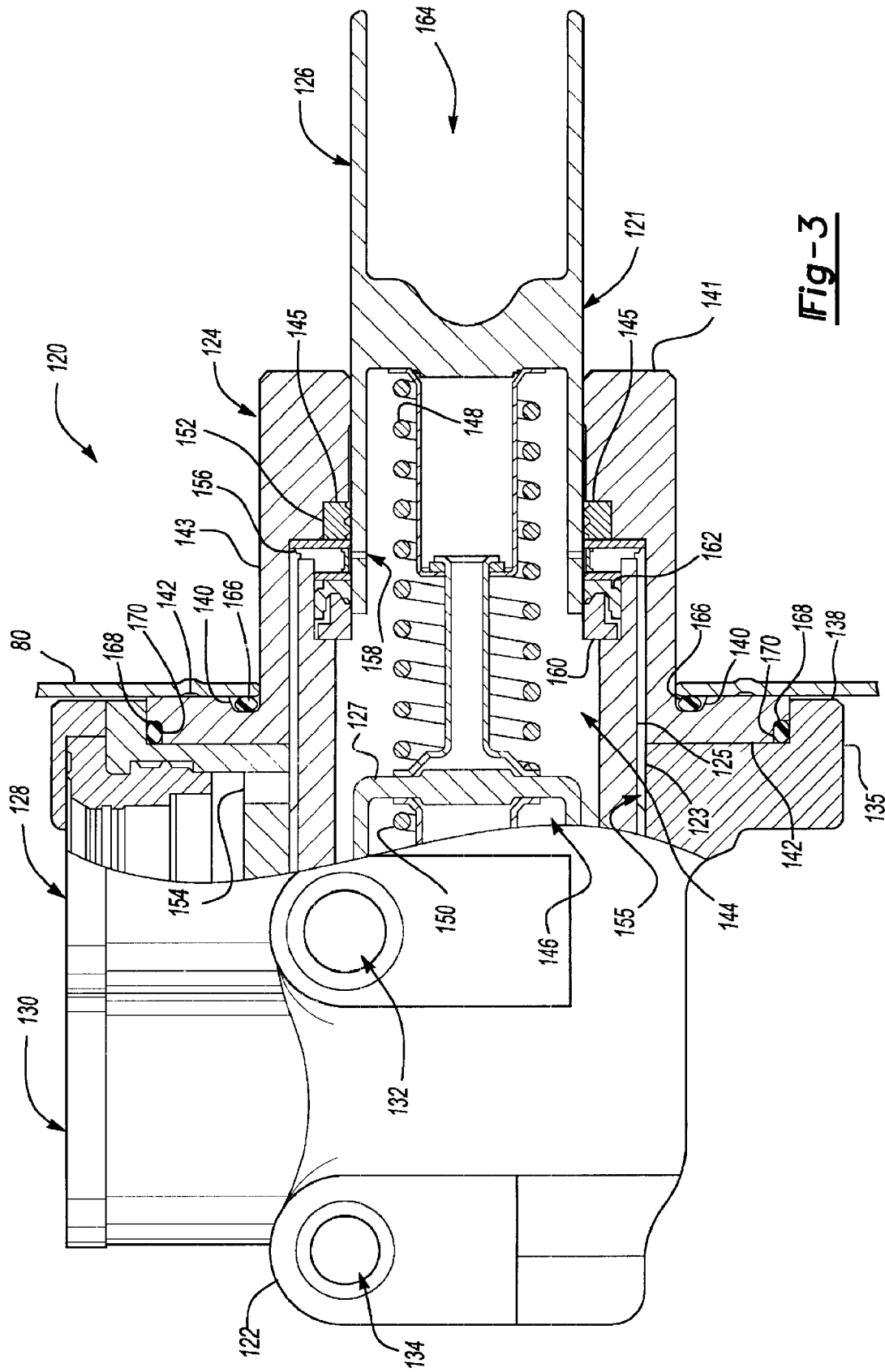
FIG. 3 shows a partial section in elevation of the boot nose area of a master cylinder incorporating the present invention.

For purposes of description herein, the terms "upper," "lower," "right," "left", "rear", "front", "vertical", "horizontal", and derivatives thereof shall relate to the invention as oriented in FIGS. 1 and 3. However, it is to be understood that the invention may assume various orientations in step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Turning to the drawings, FIG. 1 shows a master cylinder 120, which is one of the preferred embodiments of the present invention, and illustrates its various components.

Brake system master cylinder 120, as seen in FIG. 1, comprises a housing 122 having a primary fluid inlet port 128 and a secondary fluid inlet port 130 that are connected to a fluid reservoir (not shown). Ports 128 and 130 supply an operating fluid such as brake fluid to the master cylinder 120 as shown and described in greater detail below. Master cylinder 120 further includes a primary fluid outlet port 132 and a secondary fluid outlet port 134 for transmitting pressurized brake fluid to individual wheels of a vehicle to actuate the brakes at those individual wheels (not shown). Housing 122 further includes a housing attachment flange 135 having an attachment flange face 138 for abutting to a mounting surface. The master cylinder 122 embodiment as illustrated in FIG. 1 shows attachment holes 136 for receiving fasteners to mount master cylinder 120 to a desired surface (not shown).

Figure 2:
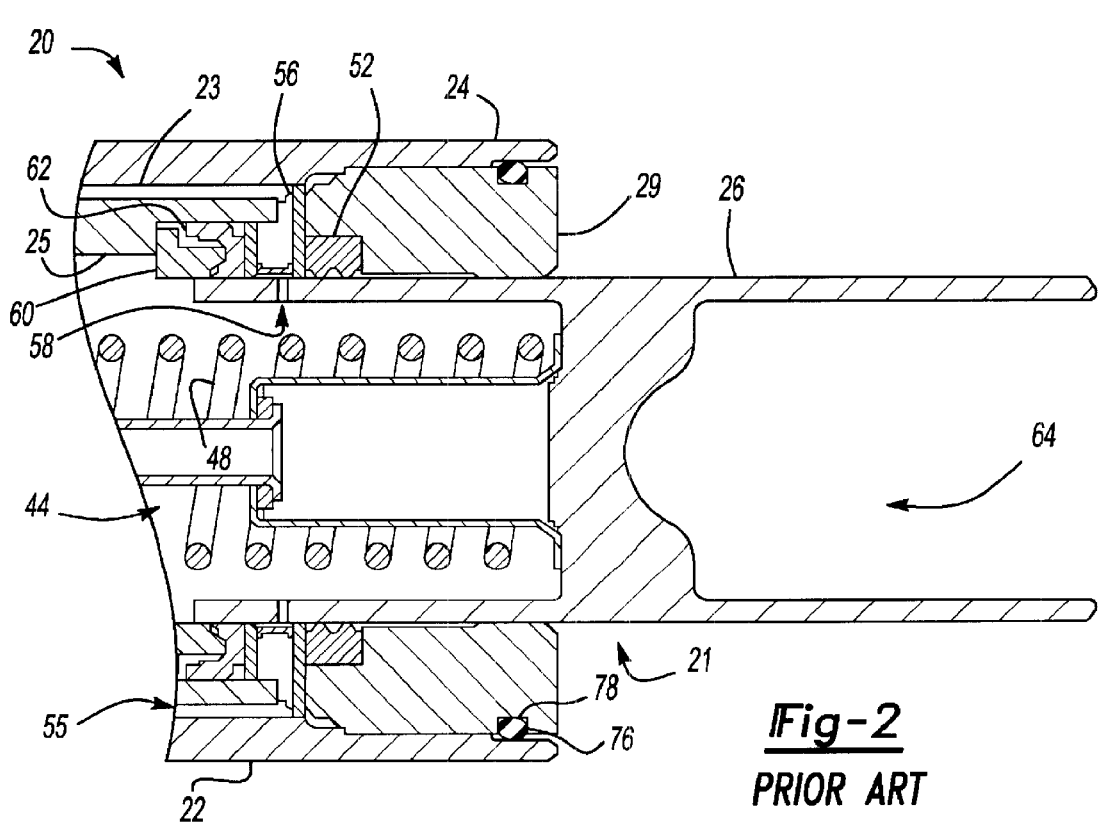
FIG. 2 shows a partial elevational section of the boot nose portion of a prior art master cylinder illustrating a bearing socket threaded into an end of the housing boot nose with the actuating mechanism components installed in the master cylinder.

As is known in the art and further illustrated in FIG. 2, the portion of master cylinder 120 extending to the right of face 138 is commonly known as the boot nose portion which is received within an appropriately sized aperture of the mounting surface and most commonly is received within the vacuum booster of a power assisted braking system. As illustrated in FIG. 2, the boot nose 24 is an extension of the prior art housing 22 and defines an internal cavity 23 of different diameters to receive piston-actuating mechanism 21. Piston actuating mechanism 21 is retained within cavity 23 with bearing socket 29. Bearing socket 29 has machined on its external surface large diameter fine threads, which correspond to like internal large diameter fine threads in boot nose 24. When threaded into boot nose 24, bearing socket 29 retains socket 125, retainer 160, compensation washer 156, and seals 152 and 162, in its desired longitudinal position with respect to housing 22 to provide for the desired operation of master cylinder 20 and can withstand the pressurized axial loading of master cylinder 20 when the piston actuating mechanism is operated to provide pressurized brake fluid to the brakes at individual vehicle wheels. Bearing socket 29 further includes a bearing seal groove 76 therearound in which is retained a bearing 0-ring 78 to provide a fluid seal between bearing socket 29 and boot nose 24. Bearing socket 29 further defines a central aperture through which a portion of primary piston 26 extends.

Returning now to FIG. 3, a side elevation view of a master cylinder 120 incorporating the present invention is shown in partial section. The internal configuration of master cylinder 120 incorporating the present invention and that of the master cylinder 20 illustrating the prior art are virtually identical such that common features between master cylinders 20 and 120 are designated by similar reference numbers wherein the last two digits are the same except those of the present invention are preceded by the number 1.

FIG. 3 illustrates a brake system master cylinder 120 incorporating a preferred embodiment of the present invention. Housing 122 incorporates primary and secondary fluid inlet ports 128 and 130, and also primary and secondary fluid outlet ports 132 and 134. Housing 122 further defines an internal cavity 123 for receiving piston-actuating mechanism 121. Piston actuating mechanism 121 comprises a primary piston 126 and a secondary piston 127 wherein the secondary piston 127 is housed in its operating position by socket 125. Primary and secondary pistons 126 and 127 operate in unison through operation of primary and secondary caged spring assemblies 148 and 150, respectively, in a manner that is well known in the art. Secondary piston 127 in its configuration and operation is substantially identical to that of primary piston 126 such that the operation of primary piston 126 will be described herein and it will be understood that secondary piston 127 operates and is configured in like manner. Primary fluid inlet port 128 is in communication with a brake fluid reservoir (not shown) to supply brake fluid through fluid supply hole 154 and into annular fluid supply 155.

In an unactuated state, the brake fluid is supplied via this route through primary compensation washer 156 and a plurality of primary bypass holes 158 in primary piston 126. When a brake actuating linkage (not shown) acts upon primary piston 126 in recess 164, primary piston 126 translates to the left. Once primary bypass holes 158 translate past primary compensation washer 156 the ambient pressure fluid supply from the reservoir is isolated from the primary chamber 144. Chamber 144 is further sealed from ambient pressure primary lip seal 162 on an interior side of primary compensation washer 156. Primary lip seal 162, primary compensation washer 156, and primary joint seal 152 are retained in their respective desired relationships by primary seal retainer 160.

As the mechanical brake linkage further translates primary piston 126 to the left, the volume of primary chamber 144 is decreased, thereby increasing the fluid pressure within primary chamber 144 and providing pressurized fluid through primary fluid outlet port 132 to the desired individual brakes at the vehicle wheels. Primary cage spring assembly 148 extending between primary piston 126 and secondary piston 127 initially causes secondary piston 127 to be translated to the left in like manner and thereby equally pressurizing the brake fluid in secondary chamber 146 and to individual brakes through secondary outlet port 134. Such leftward translation of piston 126 causes a corresponding translation of holes 158 past lip seal 162 and thereby causes increased pressure in primary chamber 144 and in turn further leftward translation of secondary piston 127.

"Housing 122 does not include a boot nose portion as in the prior art but rather terminates at housing attachment flange 135. A cup-shaped end cap or boot nose cup 124 abuts the surface of housing attachment flange 135. Boot nose cup 124 generally comprises a cannular body 143 having a bottom 141 at one end, which in the present embodiment includes an aperture through which a portion of primary piston 126 extends for interface with the mechanical brake linkage. However, it will be understood by those practiced in the art that other configurations are possible for inducing axial translation of primary piston 126 through boot nose cap 124. The boot nose cup flange 142 extends peripherally outward from cannular body 143 at an end opposite from bottom 141. Bottom 141 also defines a shoulder 145 within body 143 for retaining socket 125, retainer 160, compensation washer 156, and seals 152 and 162 in an operable configuration. Shoulder 145 is spaced from flange 142 by cannular body 143. Boot nose cup flange 142 defines an opening in boot nose cup 142 to receive at least a portion of piston actuating mechanism 121 within cannular body 143. Boot nose cup 124 thereby forms an integral portion of master cylinder 120 for retaining piston actuating mechanism in a working relationship therein and not merely as an end plug."

In its preferred embodiment, boot nose cup flange 142 includes a cup seal groove 170 therearound and a cup seal 168 such as an O-ring therein to provide a fluid seal between boot nose cup 124 and housing attachment flange 135. Boot nose cup flange 142 also defines a boot nose vacuum seal channel 140 in which is received vacuum seal 166 to provide a substantially airtight seal between master cylinder 120 and booster front housing 80 when master cylinder 120 is mounted to a vacuum booster.

Figure 4A:
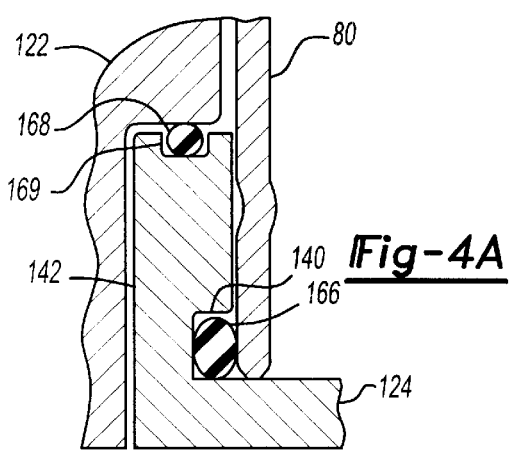
FIGS. 4A–4C illustrate alternate seal configurations of the boot nose end cap with respect to the master cylinder housing and the vacuum booster.
Figure 4B:
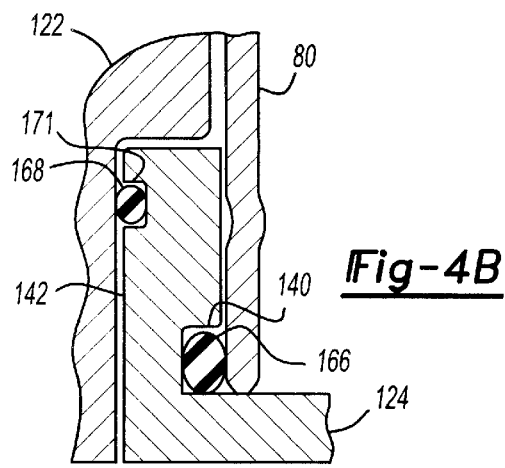
Figure 4C:
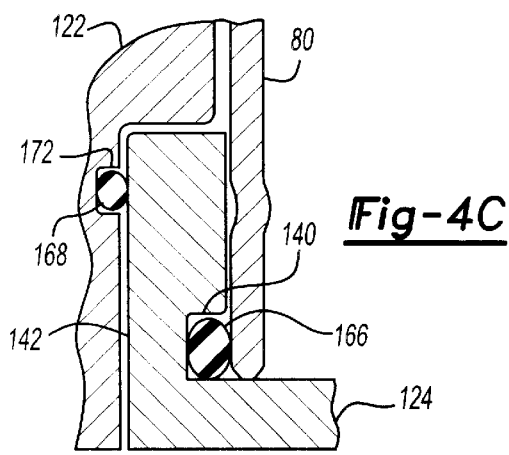

Turning now to FIGS. 4A–4C, alternative configurations are disclosed for the cup seal groove. FIG. 4A illustrates cup seal groove 169 formed in the outer edge of boot nose cup flange 142 with cup seal 168 retained therein in sealing relationship between boot nose cup 124 and housing 122. FIG. 4B illustrates cup seal groove 171 formed in the face of cup seal flange 142 that abuts to housing 122 with cup seal 168 captured therein to provide the fluid seal therebetween. FIG. 4C is similar to that of FIG. 4B except cup seal groove 172 is formed in the mating surface of housing 122 instead of the surface of boot nose cup flange 142.

With respect to the attachment mode of boot nose cup 124 in sealing relationship with housing 122, FIG. 3 contemplates the assembly of the master cylinder 120 in attachment to the vacuum booster at the manufacturing facility. No permanent fastening of boot nose cup 124 to housing 122 is therefore necessary, since the fastening of flange 135 to booster front housing 80 will provide sufficient clamping force to retain boot nose cup 124 in its desired relationship within master cylinder 120. However, it is also contemplated that a master cylinder can be supplied as a separate assembly wherein some means of positive retention are necessary between the boot nose cup 124 and the housing 122.

Figure 5:
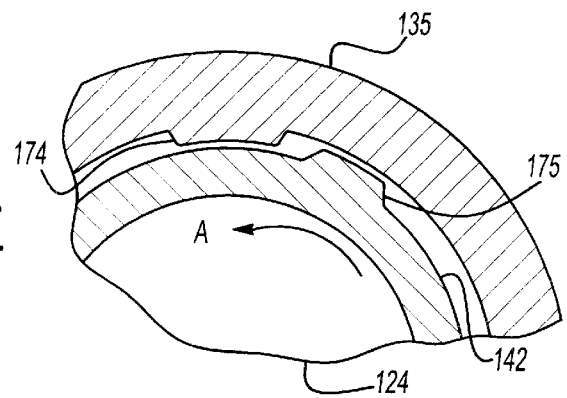
FIG. 5 illustrates a twist-lock configuration for installing and retaining the end cap to the master cylinder housing.

FIG. 5 illustrates one option for positively retaining boot nose cup 124 to flange 135 of housing 122. In the configuration contemplated by FIG. 5, flange 135 includes a housing flange tab extending inwardly toward the axial center of master cylinder 120 and further wherein flange 142 includes a tab 175 extending radially outward from the axial center of master cylinder 120. Tabs 174 and 175 are arranged such that an axial translation of boot nose cup 124 toward housing 122 and then a counter-clockwise rotation as indicated by arrow "A" will cause tabs 175 to become engaged under housing flange tabs 174, thus positively retaining boot nose cup 124 on housing 122.

Figure 6:
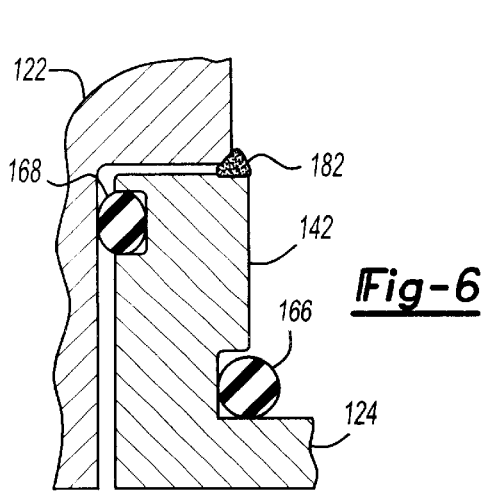
FIG. 6 illustrates fastening the end cap to the housing with a weldment.

FIG. 6 illustrates the permanent attachment of boot nose cup 124 to housing 122 with a weldment 182 about the periphery of flange 142.

Figure 7:
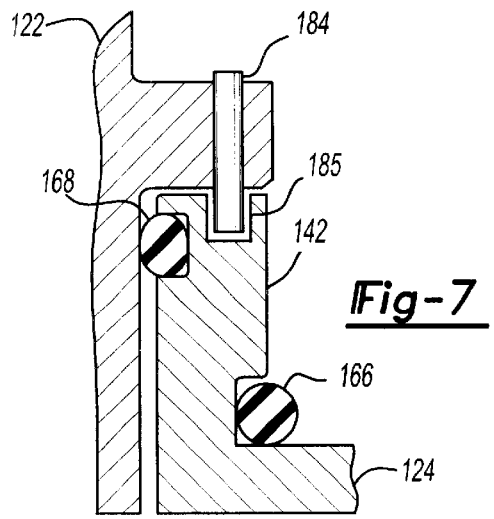
FIG. 7 illustrates fastening the end cap to the master cylinder housing with a pin or a series of pins.

FIG. 7 shows yet another contemplated configuration wherein a plurality of pins 184 extend from housing 122 and engage a peripheral groove 185 about the outer edge of boot nose flange 142.

FIG. 8 illustrates boot nose cup 124 retained to housing 122 utilizing a snap-ring 186 engaged in a snap-ring groove 187 in housing 122 and bearing upon an external face of boot nose cup flange 142.

FIG. 9 illustrates a deformable lip 188 at the periphery of boot nose cup flange 142 which, when deformed, engages a peripheral groove 189 in housing 122.

FIGS. 10A and 10B illustrate alternate configurations of utilizing a threaded bolt 190 to fasten boot nose cup 124 to housing 122.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principals of patent law, including the doctrine of equivalents.

What is claimed is:

1. A master cylinder for vehicle braking systems comprising:

a housing having a central cavity, at least one fluid supply inlet port, at least one pressure outlet port, and a flange at one end thereof;

a piston actuation mechanism within said central cavity and moveable between a first position wherein said central cavity is in fluid communication with said at least one fluid supply inlet and a second position wherein said central cavity is in fluid communication with said at least one pressure outlet; and a cup-shaped end cap fastened to said housing flange in a fluid sealing relationship, wherein said cup-shaped end cap receives at least a portion of said piston actuation mechanism therein and further retains said piston actuation mechanism in an operational configuration within said housing, said end cap including a flange defining a central opening wherein said piston actuation mechanism is received and extending outwardly therefrom and a tubular body extending axially from said flange and terminating at an opposite end, said opposite end further defining a shoulder within said tubular body, said flange axially spaced from said shoulder such that said shoulder and said flange are separated by said tubular body.

2. The master cylinder according to claim 1 wherein said cup-shaped end cap further comprises a peripheral flange therearound abutted to said housing, and said peripheral flange is in a fluid sealing relationship with said housing.

3. The master cylinder according to claim 2 wherein said peripheral flange defines a first groove on an external surface and includes a first resilient seal in said groove for abutting said master cylinder in a fluid sealing relationship to a vacuum booster.

4. The master cylinder according to claim 3 wherein a second resilient seal is captured between said peripheral flange and said housing to form said fluid sealing relationship between said housing and said cup-shaped end cap.

5. The master cylinder according to claim 4 wherein said cup-shaped end cap is fastened to said housing with bolts.

6. The master cylinder according to claim 4 wherein said cup-shaped end cap is fastened to said housing with pins.

7. The master cylinder according to claim 4 wherein said cup-shaped end cap is fastened to said housing with a snap-ring.

8. A master cylinder for vehicle braking systems comprising:
   a housing having a central cavity, at least one fluid supply inlet port, at least one pressure outlet port, and a flange at one end thereof;
   a piston actuation mechanism within said central cavity and moveable between a first position wherein said central cavity is in fluid communication with said at least one fluid supply inlet and a second position wherein said central cavity is in fluid communication with said at least one pressure outlet; and
   a cup-shaped end cap fastened to said housing flange and including a peripheral flange therearound abutted to said housing, said peripheral flange in a fluid sealing relationship with said housing, said peripheral flange further defining a first groove on an external surface and including a first resilient seal in said groove for abutting said master cylinder in a fluid sealing relationship to a vacuum booster and also including a second resilient seal captured between said peripheral flange and said housing to form said fluid sealing relationship between said housing and said cup-shaped end cap wherein said cup-shaped end cap receives at least a portion of said piston actuation mechanism therein and further retains said piston actuation mechanism in an operational configuration within said housing wherein said cup-shaped end cap is fastened to said housing with a weldment.

9. A master cylinder for vehicle braking systems comprising:
   a housing having a central cavity, at least one fluid supply inlet port, at least one pressure outlet port, and a flange at one end thereof;
   a piston actuation mechanism within said central cavity and moveable between a first position wherein said central cavity is in fluid communication with said at least one fluid supply inlet and a second position wherein said central cavity is in fluid communication with said at least one pressure outlet; and
   a cup-shaped end cap fastened to said housing flange and including a peripheral flange therearound abutted to said housing, said peripheral flange in a fluid sealing relationship with said housing, said peripheral flange further defining a first groove on an external surface and including a first resilient seal in said groove for abutting said master cylinder in a fluid sealing relationship to a vacuum booster and also including a second resilient seal captured between said peripheral flange and said housing to form said fluid sealing relationship between said housing and said cup-shaped end cap wherein said cup-shaped end cap receives at least a portion of said piston actuation mechanism therein and further retains said piston actuation mechanism in an operational configuration within said housing wherein said cup-shaped end cap is fastened to said housing by deforming at least a portion of said peripheral flange to engage a portion of said housing in a retaining manner.

10. A cup-shaped end cap for retaining a piston actuation mechanism within a master cylinder housing, said end cap comprising:
    a tubular body having a wall defining a central cavity for receiving a portion of the piston actuation mechanism therein;
    a bottom at one end, said bottom further defining an interior annular shoulder proximate to said wall; and
    a flange extending peripherally outward from said body at an opposite end, said flange defining a central opening wherein the piston actuation mechanism is received and further including a resilient seal on at least one face thereof, said flange axially spaced from said shoulder such that said tubular body separates said shoulder and said flange.

11. The cup-shaped end cap according to claim 10 wherein said flange defines a first groove in said at least one face and said resilient seal is received in said groove.

12. The cup-shaped end cap according to claim 11 wherein said flange defines a second groove on a second face and a second resilient seal is received in said second groove.

13. The cup-shaped end cap according to claim 10 wherein said bottom defines an aperture therethrough for receiving a means for actuating the piston actuation mechanism.

* * * * *